United States Patent [19]

Finkelston

[11] 4,344,216
[45] Aug. 17, 1982

[54] APPARATUS AND METHOD FOR TIGHTENING AN ASSEMBLY

[75] Inventor: Robert J. Finkelston, Colmar, Pa.

[73] Assignee: SPS Technologies, Inc., Jenkintown, Pa.

[21] Appl. No.: 101,975

[22] Filed: Dec. 10, 1979

[51] Int. Cl.$^3$ .................................................. B23P 19/06
[52] U.S. Cl. ........................................ 29/407; 29/240; 73/761; 173/12
[58] Field of Search ................... 29/240, 407; 73/139, 73/761; 173/1, 12

[56] References Cited

U.S. PATENT DOCUMENTS

| | | | |
|---|---|---|---|
| 3,962,910 | 6/1976 | Spyridakis et al. | 73/761 |
| 3,974,685 | 8/1976 | Walker | 173/12 X |
| 3,982,419 | 9/1976 | Boys | 173/12 X |
| 4,104,778 | 8/1978 | Vliet | 173/12 X |
| 4,104,779 | 8/1978 | Sigmund | 29/407 |
| 4,104,780 | 8/1978 | Sigmund | 29/407 |
| 4,106,176 | 8/1978 | Rice et al. | 29/407 |
| 4,161,221 | 7/1979 | Carlin et al. | 173/1 |
| 4,163,310 | 8/1979 | Sigmund | 29/407 |
| 4,179,786 | 12/1979 | Eshghy | 29/407 |

Primary Examiner—Ervin M. Combs
Attorney, Agent, or Firm—Aaron Nerenberg

[57] ABSTRACT

Apparatus and method for tightening assemblies held together by threaded fasteners. The desired tightened condition is achieved by turning the threaded fastener through a precise tightening angle required to induce a predetermined preload in the threaded fastener and calculated from input parameters characteristic of the assembly being tightened and the predetermined preload. The tightening angle is measured from the onset of linearity of the preload-rotation curve for the assembly by sensing the onset of the substantially linear tightening portion of the torque-rotation curve through which the assembly is taken as it is being tightened.

12 Claims, 2 Drawing Figures

APPARATUS AND METHOD FOR TIGHTENING AN ASSEMBLY

TECHNICAL FIELD

The present invention relates, in general, to the tightening of assemblies and, in particular, to an apparatus and method for tightening assemblies which are held together by threaded fasteners.

BACKGROUND ART

The precise clamping load of a threaded fastener is extremely important in determining whether or not an assembly, including the fastener, will fail in service. Consequently, threaded fasteners should be installed in a controlled manner, whereby the clamping load required to maintain the integrity of the assembly is achieved.

One common technique for controlling the tightening of threaded fasteners is to use torque control apparatus by which a specific maximum torque is applied in an attempt to attain a desired preload for particular thread and frictional conditions. Such an approach has the disadvantage that there may be variations in the torque/tension relationship from one tightening cycle to the next for the same assembly or same type of assembly due to different friction conditions, whereby varying clamping loads may be produced for a given applied torque.

Another known technique which is not dependent upon frictional conditions involves measuring the elongation of the fastener as the assembly is tightened. While this approach is capable of developing the accuracy required to achieve the desired clamping load, as a practical matter, in most cases direct measurement of elongation is either impossible or commercially unfeasible.

Yet another tightening technique which has been employed in the past in installing threaded fasteners is based on angle control. Given an estimate of the elongation required to achieve a desired clamping load, the threaded fastener is turned through a precise angle of tightening which will produce the necessary elongation. The difficulty of this approach is determining where to start measuring the angle of tightening, since it is often difficult to identify the initiation of the elongation of the fastener.

U.S. Pat. No. 3,982,419 is directed to an apparatus and method which involve tightening threaded fasteners into the yield region of the fasteners. Under such conditions, the disadvantages of the other techniques described above are avoided and the integrity of the assembly is greatly enhanced. There are, however, applications where the threaded fastener preferably is tightened to some point within its elastic range. For example, in the installation of certain high strength bolts, tightening to some clamping load below the elastic limit of the fastener will provide the desired condition.

U.S. Pat. No. 4,104,780 to Sigmund and U.S. Pat. No. 4,104,778 to Vliet are each directed to a method and apparatus for tightening assemblies held together by threaded fasteners in which the tightening technique is based upon imparting a prescribed rotation to the threaded fasteners after the starting point for the prescribed rotation has been determined by detecting that the rate of change of torque applied to the fastener with respect to rotation is a constant. Although the underlying concept in each of these two patents, in theory, will produce a joint tightened to the desired degree, certain additions and modifications need to be made to the embodiments described to render the method and apparatus in each of these patents suitable for practical implementation.

DISCLOSURE OF INVENTION

Accordingly, it is an object of the present invention to provide a new and improved apparatus and method for tightening an assembly including a threaded fastener.

It is another object of the present invention to provide an apparatus and method for tightening an assembly including a threaded fastener which involve tightening the fastener to a clamping load within its elastic range.

It is yet another object of the present invention to provide an apparatus and method for tightening an assembly including a threaded fastener which are relatively accurate and efficient.

The tightening technique employed by the present invention falls within the broad category of angle control tightening. The desired tightened condition of the assembly is achieved by turning the threaded fastener through a precise tightening angle to induce the desired preload in the fastener. This result is obtained by calculating the tightening angle from input parameters characteristic of the assembly being tightened and the desired preload and identifying properly the point at which to start the measurement of the tightening angle.

In accordance with the apparatus and method of the present invention, an assembly, including a threaded fastener, is tightened by imparting torque and rotation to the fastener, whereby the assembly is taken through a torque-rotation curve having a non-linear tightening portion followed by a substantially linear tightening portion. The preload which is to be induced in the fastener when the assembly has been tightened to the desired degree and the preload at the onset of the substantially linear tightening portion are established in advance of the tightening of the assembly as is the tension rate of the assembly. As torque and rotation are imparted to the fastener, an indication of the onset of the substantially linear tightening portion of the torque-rotation curve is developed along with a measure of the amount of rotation being imparted to the fastener. The difference between the preload to be induced in the fastener at the desired tightened condition and the preload at the onset of the substantially linear tightening portion divided by the tension rate corresponds to the tightening angle of rotation to be imparted to the fastener, after the onset of the substantially linear tightening portion, necessary to develop the desired preload in the fastener. The stoppage of drive to the fastener is effected by comparing the tightening angle with the amount of rotation actually being imparted to the fastener to tighten the assembly and developing an indication when the drive has imparted a rotation to the fastener, starting from the onset of the substantially linear tightening portion, equal to the tightening angle.

BRIEF DESCRIPTION OF DRAWINGS

Referring to the drawings.

BEST MODE OF CARRYING OUT THE INVENTION

Figure 1:
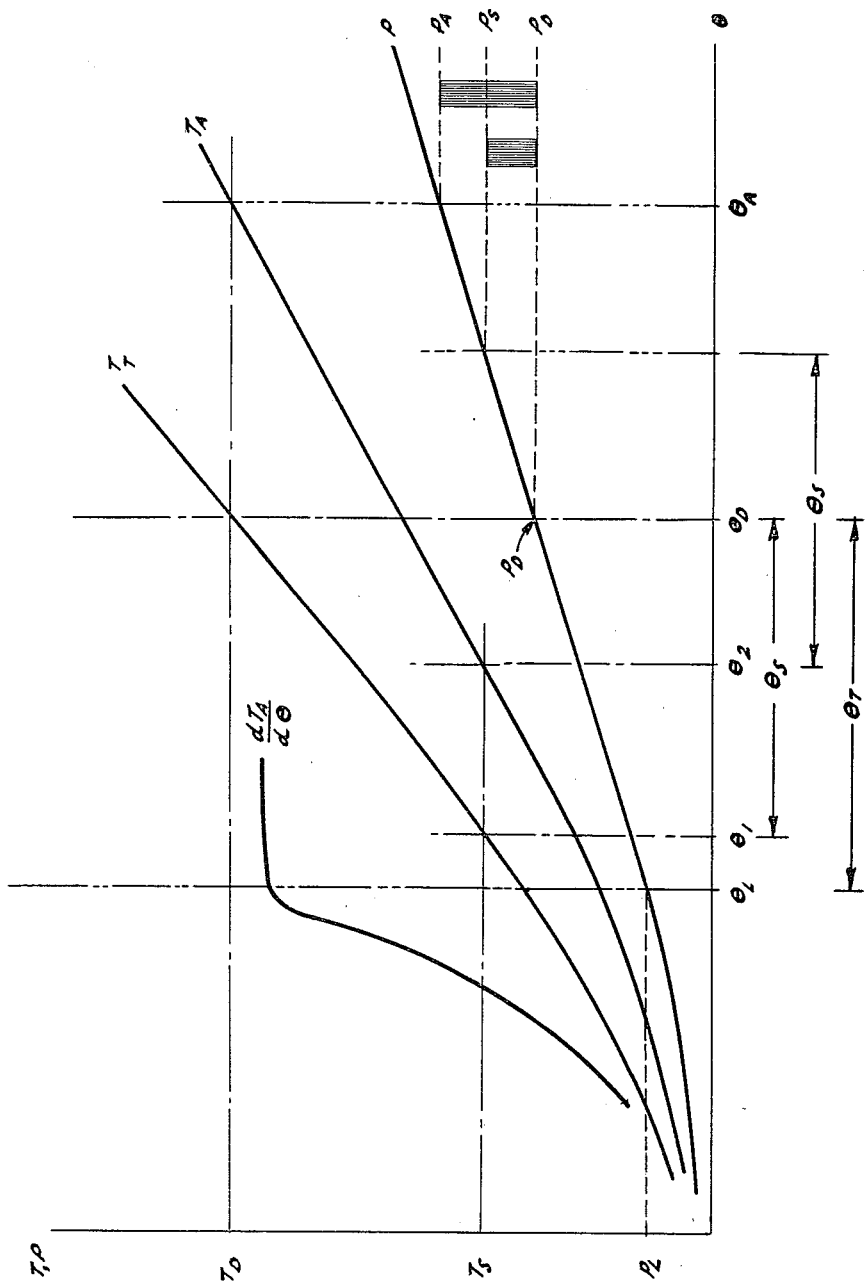
FIG. 1 shows the idealized tightening curves associated with a typical assembly held together by a threaded fastener and the manner in which a desired, predetermined preload is induced in the fastener, in accordance with the present invention, to achieve a properly tightened condition for the assembly.

Referring to FIG. 1, the tightening curves which are illustrated are idealized in that they are shown to have smooth and linear portions, when, in fact, under practical conditions they are somewhat irregular due to electrical and mechanical noise and the linear portions typically are, at best, substantially linear, rather than truly linear. The tightening technique of the present invention may be most readily understood by dealing with idealized curves.

The curve identified by P is a preload-rotation curve and $P_D$ represents the desired, predetermined preload which is to be induced in the threaded fastener when the assembly has been tightened to the desired degree. This curve may be derived either by calculation or experimentation. Given the physical characteristics of the assembly, including the threaded fastener, curve P may be derived from the equation which defines the preload versus angle relationship $P=K\theta$. Alternatively, curve P may be obtained by actual measurements of preload induced in a fastener in a sample assembly as it is being tightened.

The curve identified by $T_T$ is the theoretical torque-rotation curve for the assembly. This curve also may be derived by calculation or obtained by experimentation. Because there is likely to be a variety of torque-rotation curves for a given assembly, curve $T_T$, when derived experimentally, is developed by taking the average of several such curves.

Curve $T_A$ is the actual torque-rotation curve for the assembly. This curve is derived "on-the-fly" as the particular assembly is being tightened by sensing the torque and rotation imparted to the threaded fastener to tighten the assembly.

Curves $T_A$ and $T_T$ are shown to be different to reflect the possibility of different friction conditions from one tightening cycle to another of the same assembly which will result in different torque-rotation curves for different tightening cycles of the same assembly. This situation illustrates the disadvantage of torque control apparatus mentioned previously. If the shut-off equipment is set to a given torque level $T_D$ to achieve, according to curves $T_T$ and P, the desired preload $P_D$ and, in fact, the actual torque-rotation curve for the tightening cycle is $T_A$, the fastener rotation will be taken in $\theta_A$ rather than $\theta_D$. This will result in an induced preload $P_A$ rather than the desired preload $P_D$. The shaded area between $P_A$ and $P_D$ indicates the variation in induced loads in the threaded fastener for a variation in torque-rotation curves between $T_T$ and $T_A$.

Angle control tightening, also mentioned previously, is based on that portion of the preload-rotation curve where the two parameters are linearly related. Knowing this relationship and knowing when the linear portion starts, a desired predetermined preload may be induced in the threaded fastener by imparting a controlled amount of rotation to the fastener. In the past, the prevalent practice for determining the starting point for imparting this controlled amount of rotation has been to sense a prescribed torque level and impart the fixed amount of rotation to the fastener starting at that point. For a prescribed torque level of $T_S$, the starting points for imparting a tightening angle of $\theta_S$ are spaced apart by an angle between $\theta_1$ and $\theta_2$ equal to the spread of the $T_T$ and $T_A$ curves at the $T_S$ torque level. FIG. 1 shows the variation in induced loads in the shaded area between $P_D$ and $P_S$ when the same amount of rotation $\theta_S$ is imparted to a threaded fastener, but the starting points fall between $\theta_1$ and $\theta_2$.

In accordance with the present invention, the desired predetermined preload to be induced in the threaded fastener is achieved in the following manner. The preload $P_L$ in the threaded fastener at the point at which the preload-rotation curve becomes linear is derived either by calculation or obtained by experimentation. This point is independent of friction and is strictly a function of the linear behavior of the assembly as load is applied.

Next, the slope of the linear portion of the preload-rotation curve is derived either by calculation or obtained by experimentation. This slope represents the tension rate TR of the assembly and may be determined from the following relationship:

$$TR=(P_E-P_L)/(\theta_E-\theta_L) \tag{1}$$

Where
 $P_L$ is the induced load when the preload-rotation curve becomes linear
 $\theta_L$ is the angle at which the preload-rotation curve becomes linear
 $P_E$ is the induced load at the elastic limit of the fastener
 $\theta_E$ is the angle at the elastic limit of the fastener.

Although not shown in FIG. 1, it is understood that the elastic limit of the fastener is that point on the preload-rotation curve when this curve is no longer linear.

The desired, predetermined preload $P_D$ is related to the tension rate of the assembly as follows:

$$TR=(P_D-P_L)/(\theta_D-\theta_L) \tag{2}$$

Where
 $P_L$ and $\theta_L$ are as defined above in connection with Equation (1)
 $\theta_D$ is the angle at which the desired, predetermined preload is developed.

Transposing Equation (2):

$$\theta_D-\theta_L=(P_D-P_L)/TR=\theta_T \tag{3}$$

$\theta_D-\theta_L$ represents the amount of rotation $\theta_T$ which must be imparted to the threaded fastener, after the onset of linearity of the preload-rotation curve P, to achieve the desired preload $P_D$.

The stopping point of a power tool can vary with motor friction, rotor inertia and control valve speed. In order to compensate for the effect of such variables, a correction factor is applied to the tightening angle $\theta_T$. Whereas motor friction tends to stop the tool, rotor inertia and inadequate control valve speed tend to cause the tool to go beyond the desired degree of rotation. The net effect is to require a tightening angle less than $\theta_T$ of Equation (3) to achieve the desired predetermined preload.

The onset of linearity of the preload-rotation curve P is sensed by monitoring the actual torque-rotation curve $T_A$ as it is being generated during tightening of the assembly. Torque-rotation curve $T_A$ has a non-linear tightening portion followed by a substantially linear tightening portion. The onset of the substantially linear tightening portion of the actual torque-rotation curve $T_A$ occurs at the same angle as the onset of linearity of the preload-rotation curve P. Thus, by monitoring the actual torque-rotation curve $T_A$, the onset of linearity of the preload-rotation curve P may be determined. This may be accomplished by sensing the torque and rotation imparted to the threaded fastener, developing an indication of the gradient of the actual torque-rotation curve and determining when the gradient is substantially constant. The gradient curve $dT_A/d\theta$, the initial portion of which is shown in FIG. 1, has a changing value during the non-linear tightening portion of the actual torque-rotation curve $T_A$ and a substantially constant value during the substantially linear tightening portion of the actual torque-rotation curve. By sensing the onset of the substantially constant value of the gradient curve $dT_A/d\theta$, the onset of linearity of the preload-rotation curve P is determined and the starting point of the tightening angle, which is to be imparted to the threaded fastener, is established.

Figure 2:
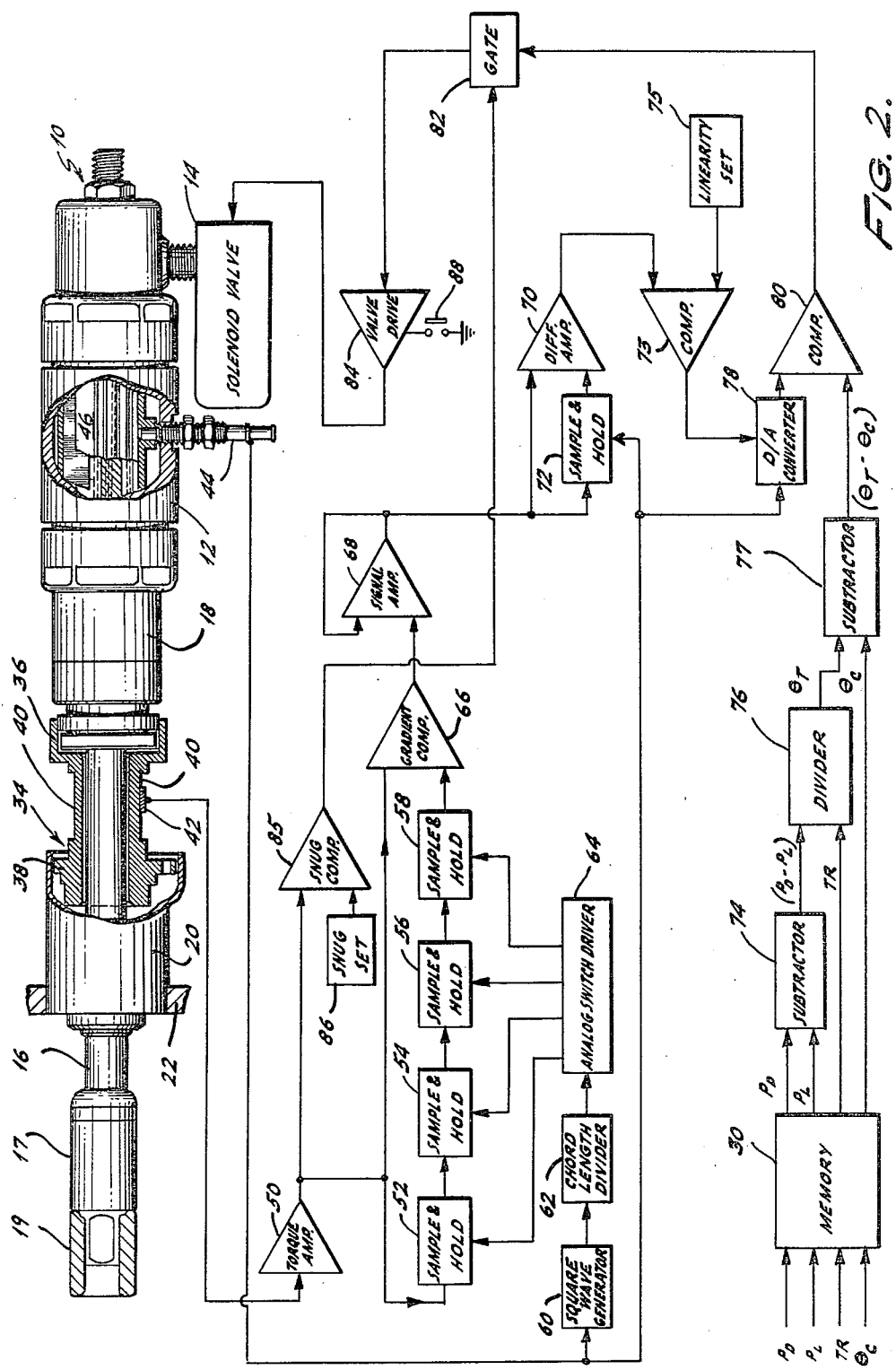
FIG. 2 shows a preferred embodiment of tightening apparatus constructed in accordance with the present invention.

FIG. 2 is a diagram of a preferred embodiment of tightening apparatus constructed in accordance with the present invention. This apparatus includes driving means for imparting torque and rotation to a fastener to tighten an assembly held together by the fastener. The driving means may be a wrench 10, having an air motor 12, the operation of which is controlled by a suitable solenoid valve 14, and which drives an output shaft 16 through a speed-reducing gear box 18 so that the output shaft does not rotate at the same high speed of the motor. Output shaft 16 carries an adapter 17 for attachment with a bit driver 19 and is mounted in a suitable rotary bearing assembly 20 facilitating rotation of and taking up any bending stresses in the output shaft. Bearing assembly 20 may be mounted on a rigid frame 22, but use of the frame is not necessary for the practice of the invention. At this point it should be noted that while motor 12 has been described as an air motor, it may be of any suitable type, for example, electric, hydraulic or any combination of pneumatic, electric or hydraulic. It should also be noted that the apparatus thus far described is generally conventional and need not be explained in greater detail.

The FIG. 2 apparatus also includes means for supplying:

(1) a first preload signal representative of a predetermined preload ($P_D$) which is to be induced in the fastener when the assembly being tightened by the driving means has been tightened to a desired degree;

(2) a second preload signal representative of the preload ($P_L$) at the onset of the substantially linear tightening portion of curve $T_A$; and (3) a tension rate signal representative of the tension rate (TR) of the assembly being tightened.

Such means may include a memory system 30 in which the three inputs are stored. Memory system 30 may be three conventional potentiometers which are set to represent the two preloads and the tension rate.

The tightening apparatus further includes torque sensing means responsive to the drive means for developing a torque signal representative of the torque imparted to the threaded fastener. Such means may include a torque cell 34 located between gear box 18 and bearing assembly 20. Torque cell 34 develops a signal representative of the instantaneous torque being imparted to the fastener. Torque cell 34 includes a first mounting base 36 securing the cell to gear box 18 and a second mounting base 38 securing it to bearing assembly 20. Extending axially of the wrench between mounting bases 36 and 38 are a plurality of strut members 40 which are somewhat deformable, that is, they are relatively rigid members capable of twisting somewhat about the axis of the wrench. When wrench 10 is operative to tighten a fastener, the reaction torque action thereon causes strut members 40 to twist about the axis of the wrench, the amount of twisting being proportional to the reaction torque which, of course, is equal to and opposite the torque being applied to the fastener. Each strut member 40 carries a strain gauge 42 which is connected to a Wheatstone bridge circuit (not shown) to develop an electric signal representative of the instantaneous torque being applied to the fastener. It should be noted that instead of strain gauges, contacting or proximity displacement gauges could be used to develop the electric signal representative of the torque being imparted to the fastener. In addition, the exact form of the torque cell 34 may vary somewhat. For example, struts 40 may be replaced by a somewhat deformable cylindrical member, if desired. In general, any suitable device for measuring torque may be substituted.

The tightening apparatus further includes angle sensing means responsive to the driving means for developing a first angle signal representative of the rotation imparted to the threaded fastener. Such means may include a proximity probe 44 mounted through the housing of motor 12 adjacent to and radially spaced from rotary vanes 46 in the motor. Proximity probe 44 may be in the form of an induction coil which develops an electric signal when metal passes through its magnetic field. Thus, as vanes 46 rotate when the fastener is being tightened, signals are provided by proximity probe 44 which represent fixed increments of rotation of the fastener. The size of the increments depends on the number of vanes 46 in motor 12 and the gear ratio of gear box 18. It should be understood that proximity probe 44 may be arranged to cooperate with one of the gears in gear box 18 in a similar manner.

Also included in the tightening apparatus of FIG. 2 are means responsive to the torque signal and the first angle signal for developing a gate signal at the onset of the substantially linear tightening portion of torque-rotation curve $T_A$. In particular, the output signal from torque cell 34, representative of the instantaneous torque being imparted to the fastener, is supplied to a torque amplifier 50 which amplifies the torque signal to a level at which it is compatible with the rest of the system. From amplifier 50, the torque signal is fed through shift register means which comprise a series of charge coupled devices in the form of sample and hold circuits 52, 54, 56 and 58. The shift register means are clocked by the signals representative of fixed angular increments of rotation of the threaded fastener. Specifically, signals from proximity probe 44, which are in the form of spike shaped pulses, are fed to a square wave generator 60 which shapes the signals and feeds the shaped signals through a chord length divider 62 to an analog switch driver 64 which sequentially clocks sample and hold circuits 52, 54, 56 and 58. Chord length divider 62 is a suitable divider circuit which electronically divides the pulses from square wave generator 60 by one, two, four, eight, sixteen or thirty-two so that every pulse, or every second pulse, or every fourth pulse, etc. is used to clock the shift register.

Analog switch driver 64, although not necessary, assures that each sample and hold circuit has discharged its stored signal before receiving a new signal. Accordingly, analog switch driver 64 sequentially clocks the sample and hold circuits first clocking circuit 52, then circuit 54, then circuit 56, and finally circuit 58. Thus, sample and hold circuit 58 has discharged its stored signal prior to receiving a new signal from sample and hold circuit 56 and likewise for the remaining sample and hold circuits. The output from sample and hold circuit 58 is representative of torque a fixed increment of rotation prior to that particular instant and is fed to a gradient comparator 66 in the form of a conventional differential amplifier which also receives an input signal, representative of the instantaneous torque being applied to the fastener, directly from torque amplifier 50. Gradient comparator 66 subtracts its two input signals and develops an output signal representative of the instantaneous torque gradient of torque-rotation curve $T_A$. In particular, the two inputs to comparator 66 are samples of the torque signal taken at different rotational positions of the fastener, one being the torque at that particular position of the fastener and one, delayed by sample and hold circuits 52, 54, 56 and 58, being the torque at a previous position of the fastener. Thus, the output of comparator 66 represents the change in the torque signal over a fixed increment of rotation of the fastener. The gradient signal from gradient comparator 66 is fed to a suitable signal amplifier 68 which amplifies the gradient signal to a magnitude compatible with the rest of the system.

From the foregoing, it is seen that the gradient signal is developed by comparing the torques being applied to the fastener at different times to develop indications of the changes in torque over fixed increments or rotation imparted to the fastener. By selecting the appropriate division to be made in chord length divider 62, it is possible to adjust the chord length over which the gradient is being calculated. In this way, the apparatus may be adjusted to distinguish between actual torque changes and electrical and mechanical noise.

The output of signal amplifier 68 is supplied simultaneously to a differential amplifier 70 and a sample and hold circuit 72 which is clocked by signals from proximity probe 44. Differential amplifier 70 also may be in the form of a conventional differential amplifier which subtracts its two inputs. The combination of differential amplifier 70 and sample hold circuit 72 serves to develop a gate signal at the onset of the substantially linear tightening portion of the torque-rotation curve. In particular the two inputs to differential amplifier 70 are samples of the gradient signal taken at different rotational positions of the fastener, one being the gradient at the current particular position of the fastener and one, delayed by sample and hold circuit 72, being the gradient at a previous position of the fastener. Thus, the output of differential amplifier 70 represents the change in the gradient signal over a fixed increment of rotation of the fastener. When operating in the substantially linear tightening portion of curve $T_A$, the gradient signal $dT_A/d\theta$ is substantially constant. Therefore, if the two angle displaced gradient signal inputs to differential amplifier 70 are the same, the subtraction operation performed by the differential amplifier yields a zero and the onset of the substantially linear tightening portion is sensed. Differential amplifier 70 is conditioned to provide a distinct output signal when this occurs.

As stated previously, the tightening curves shown in FIG. 1 are idealized representations of what actually occurs under practical conditions. In order to sense the onset of a substantially linear tightening portion rather than a truly linear tightening portion, differential amplifier 70 may be conditioned to provide a gate signal when the change in the two gradient inputs to the differential amplifier is less than a prescribed amount. In other words, if the gradient signal supplied to differential amplifier 70 directly from signal amplifier 68 differs from the delayed gradient signal supplied to differential amplifier 70 through sample and hold circuit 72 by less than a preset amount, the differential amplifier is effective to sense the onset of a substantially linear gradient. Such a modification may be built into differential amplifier 70 or yet another comparator 73 may be provided at the output of differential amplifier 70. The gate signal developed by differential amplifier 70 is compared against a reference established by a linearity set circuit 75 and when the gate signal is equal to or less than the reference, comparator 73 passes the gate signal through. Linearity set circuit 75 may be in the form of a suitable potentiometer.

In order to prevent a false indication of the onset of the substantially linear tightening portion of curve $T_A$, it may be desirable to condition the FIG. 2 circuitry to require more than one output signal from differential amplifier 70 before signalling that the substantially linear tightening portion of the curve has been reached. This may be accomplished by placing a counter circuit (not shown) at the output of comparator 73 which is set to generate the gate signal only after differential amplifier 70 has produced a prescribed number of output signals.

Also included in the tightening apparatus are means for determining tightening angle $\theta_T$ defined by Equation (3). This angle represents the amount of rotation which is to be imparted to the threaded fastener, after the onset of the substantially linear tightening portion of the torque-rotation curve $T_A$, to achieve the desired preload $P_D$. Specifically the outputs of memory system 30, which carry the signals representative of $P_D$ and $P_L$, are supplied to a subtractor 74, the output of which, in turn, is supplied to a divider 76 along with the output from memory system 30 which carries the signal representative of the tension rate TR of the assembly. Subtractor 74 and divider 76 also may be of conventional construction and operation. The output of divider 76 is a signal representative of the tightening angle $\theta_T$.

As stated previously, a correction factor may be applied to the tightening angle $\theta_T$ to compensate for the driving means overshooting the desired tightened condition when shut-off of the driving means is set to occur precisely after a tightening angle equal to $\theta_T$ has been imparted to the fastener. This correction factor can be determined during trial tightening cycles by measuring the total angle of rotation of the fastener with the system set to impart only an angle of rotation equal to $\theta_T$. The excess rotation of the fastener beyond angle $\theta_T$ represents the overshoot. By subtracting the overshoot from angle $\theta_T$, the newly calculated tightening angle, when imparted to the fastener, should produce a total rotation of the fastener, including the overshoot, necessary to achieve the desired preload.

The correction factor to the tightening angle may be introduced in the apparatus of FIG. 2 a number of ways.

The correction factor $\theta_C$ may be stored in memory system 30 and supplied to a substractor 77 to which the output $\theta_T$ from divider 76 also is supplied. The output of subtractor 77 represents the corrected tightening angle. Alternatively, the correction factor $\theta_C$ may be set into divider 76 so that the output of the divider automatically represents the corrected tightening angle.

The tightening apparatus of FIG. 2 also includes comparison means responsive to the angle signal developed by proximity probe 44, the tightening angle signal supplied from subtractor 77, and the gate signal developed by comparator 70 for comparing the rotation imparted to the fastener, after the onset of the substantially linear tightening portion of curve $T_A$, with the tightening angle and for developing a control signal when the rotation imparted to the fastener, after the onset of the substantially linear tightening portion, is equal to the tightening angle. Specifically, the angle signal from the probe, representative of rotation imparted to the fastener, is in digital form. This signal is supplied to a conventional digital-to-analog converter 78 to develop a signal which is in analog form and representative of the total rotation imparted to the fastener. In particular, digital-to-analog converter 78 is operative to count, by means of a conventional counter within the digital-to-analog converter, successive incremental rotational signals from proximity probe 44 to develop a signal representative of the total rotation of the fastener, convert this latter signal into analog form and store this analog signal. The output of digital-to-analog converter 78 is compared to the tightening angle signal supplied from subtractor 77 by a comparator 80. This comparison is initiated at the onset of the substantially linear tightening portion of torque-rotation curve $T_A$ as a result of the gate signal developed by differential amplifier 70 being supplied, through comparator 73, to digital-to-analog converter 78. The gate signal functions to reset digital-to-analog converter 78 to zero and permit the development of the analog signal representative of the total rotation being imparted to the fastener. So long as there is a difference between the two inputs to comparator 80, the comparator develops an output signal representative of this difference. When the two inputs to comparator 80 are the same, namely after sufficient rotation has been imparted to the fastener so that the output of digital-to-analog convertor 78 becomes equal to tightening angle, comparator 80 develops a control signal. Comparator 80 is conditioned to provide a distinct output signal when the two inputs to the comparator are equal.

The tightening apparatus further includes control means for supplying the control signal to the driving means to stop the driving means from imparting torque and rotation to the fastener. The control means may include a gate circuit 82 and a valve drive circuit 84 which serve to supply the control signal, developed by comparator 80, to solenoid valve 14 to shut down the drive of wrench 10. When comparator 80 develops an output signal representative of the difference between the two inputs to the comparator, the output signal is supplied through gate circuit 82 to valve drive circuit 84 which, in turn, controls solenoid valve 14 to drive wrench 10. When comparator 80 develops the control signal, valve drive circuit 84 senses this distinct output signal and causes solenoid valve 14 to shut down the drive of wrench 10. Valve drive circuit 84 may be in the form of a suitable amplifier which amplifies the control signal to a level sufficient to cause solenoid valve 14 to become actuated.

To assure that the output from comparator 80 does not inadvertently shut down the drive of wrench 10 during the non-linear tightening portion of the torque-rotation curve, gate circuit 82 receives an additional input signal from a snug torque comparator 85. Instantaneous torque signals are fed from torque amplifier 50 to snug torque comparator 85 which also receives an input signal from a snug torque set circuit 86. This circuit may be in the form of a suitable potentiometer. The snug torque level is selected by considering the torque level at which the onset of the substantially linear tightening portion is estimated and the preload which is to be induced into the fastener when the assembly has been tightened to the desired degree. When the level of the instantaneous torque signal from torque amplifier 50 exceeds the level set by snug torque set circuit 86, snug comparator 85 provides a signal to gate circuit 82 which allows the control signal from comparator 80 to be supplied to valve drive circuit 84. Thus, until gate circuit 82 is conditioned to permit signals from comparator 80 to pass to valve drive circuit 84, the drive of wrench 10 will not be shut down prematurely.

A reset switch 88 is provided to clear the circuits and prepare the tightening apparatus for a new tightening operation with another fastener.

Although the invention has been described as employing functional circuit components, it will be understood that an appropriately programmed microprocessor may be substituted and that such an arrangement is still within the spirit and scope of the invention.

I claim:

1. Apparatus for tightening an assembly including a threaded fastener comprising:

driving means for imparting torque and rotation to the fastener to tighten the assembly, the torque-rotation curve which could be plotted for the assembly having a non-linear tightening portion followed by a substantially linear tightening portion;

means for supplying (1) a first preload signal representative of a predetermined preload which is to be induced in the fastener when the assembly has been tightened to a desired degree, (2) a second preload signal representative of the preload at the onset of said substantially linear tightening portion, and (3) a tension rate signal representative of the tension rate of the assembly;

torque sensing means responsive to said driving means for developing a torque signal representative of the torque imparted to the fastener;

angle sensing means responsive to said driving means for developing a first angle signal representative of the rotation imparted to the fastener;

means responsive to said torque signal and said first angle signal for developing a gate signal at said onset of said substantially linear tightening portion;

processing means reponsive to said first preload signal, said second preload signal, and said tension rate signal for developing a second angle signal representative of a tightening angle between said onset of said substantially linear tightening portion and said predetermined preload, said tightening angle being related to the difference between said predetermined preload and said preload at said onset of said substantially linear tightening portion divided by said tension rate;

comparison means responsive to said first angle signal, said second angle signal, and said gate signal for comparing the rotation imparted to the fastener after said onset of said substantially linear tightening portion with said tightening angle and for developing a control signal when said rotation imparted to the fastener after said onset of said substantially linear tightening portion is equal to said tightening angle;

and control means for supplying said control signal to said driving means to stop said driving means from imparting torque and rotation to the fastener.

2. Apparatus for tightening an assembly including a threaded fastener comprising:

driving means for imparting torque and rotation to the fastener to tighten the assembly, the torque-rotation curve which could be plotted for the assembly having a non-linear tightening portion followed by a substantially linear tightening portion;

memory means for storing (1) a first preload signal representative of a predetermined preload which is to be induced in the fastener when the assembly has been tightened to a desired degree, (2) a second preload signal representative of the preload at the onset of said substantially linear tightening portion, and (3) a tension rate signal representative of the tension rate of the assembly;

torque sensing means responsive to said driving means for developing a torque signal representative of the torque imparted to the fastener;

angle sensing means responsive to said driving means for developing a first angle signal representative of the rotation imparted to the fastener;

gradient calculating means responsive to said torque signal and said first angle signal for developing a gradient signal representative of the gradient of said torque-rotation curve and for developing a gate signal at said onset of said substantially linear tightening portion;

processing means responsive to said stored first preload signal, said stored second preload signal, and said stored tension rate signal for developing a second angle signal representative of a tightening angle between said onset of said substantially linear tightening portion and said predetermined preload, said tightening angle being related to the difference between said predetermined preload and said preload at said onset of said substantially linear tightening portion divided by said tension rate;

comparison means responsive to said first angle signal, said second angle signal, and said gate signal for comparing the rotation imparted to the fastener after said onset of said substantially linear tightening portion with said tightening angle and for developing a control signal when said rotation imparted to the fastener after said onset of said substantially linear tightening portion is equal to said tightening angle;

and control means for supplying said control signal to said driving means to stop said driving means from imparting torque and rotation to the fastener.

3. Apparatus according to claim 2 wherein said gradient calculating means include:

first delay means responsive to the torque signal and the first signal for delaying said torque signal for a predetermined rotation of the threaded fastener;

first comparison means responsive to said torque signal and said delayed torque signal for developing the gradient signal;

second delay means responsive to said gradient signal and said first angle signal for delaying said gradient signal for a predetermined rotation of the threaded fastener;

and second comparison means responsive to said gradient signal and said delayed gradient signal for developing the gate signal.

4. Apparatus according to claim 3 wherein said second comparison means develop the gate signal when the gradient signal and the delayed gradient signal are substantially equal.

5. Apparatus for tightening an assembly including a threaded fastener comprising:

driving means for imparting torque and rotation to the fastener to tighten the assembly, the torque-rotation curve which could be plotted for the assembly having a non-linear tightening portion followed by a substantially linear tightening portion;

means for supplying (1) a first preload signal representative of a predetermined preload which is to be induced in the fastener when the assembly has been tightened to a desired degree, (2) a second preload signal representative of the preload at the onset of said substantially linear tightening portion, and (3) a tension rate signal representative of the tension rate of the assembly;

torque sensing means responsive to said driving means for developing a torque signal representative of the torque imparted to the fastener;

angle sensing means responsive to said driving means for developing a first angle signal representative of the rotation imparted to the fastener;

gradient calculating means responsive to said torque signal and said first angle signal for developing a gradient signal representative of the gradient of said torque-rotation curve, said gradient signal having a changing value during said non-linear tightening portion and a substantially constant value during said substantially linear tightening portion;

means responsive to said first preload signal, said second preload signal, and said tension rate signal for developing a second angle signal representative of a tightening angle between said onset of said substantially linear tightening portion and said predetermined preload, said tightening angle being related to the difference between said predetermined preload and said preload at said onset of said substantially linear tightening portion divided by said tension rate;

processing means responsive to said first angle signal, said second angle signal and said gradient signal for (1) sensing the onset of said substantially constant value of said gradient signal, (2) developing a gate signal at said onset of said substantially constant value of said gradient signal, (3) comparing the rotation imparted to the fastener, after said onset of said substantially constant value of said gradient signal, with said tightening angle, and (4) developing a control signal when said rotation imparted to the fastener, after said onset of said substantially constant value of said gradient signal, is equal to said tightening angle;

and control means for supplying said control signal to said driving means to stop said driving means from imparting torque and rotation to the fastener.

6. Apparatus according to claim 5 wherein said processing means include:
delay means responsive to the gradient signal and the first angle signal for delaying said gradient signal for a predetermined rotation of the threaded fastener;
and a comparator responsive to said gradient signal and said delayed gradient signal for developing the gate signal.

7. Apparatus according to claim 6 wherein said comparator develops the gate signal when the gradient signal and the delayed gradient signal are substantially equal.

8. A method for tightening an assembly including a threaded fastener to which torque and rotation are imparted to induce a predetermined preload when said assembly has been tightened to a desired degree, the torque-rotation curve which could be plotted for the assembly having a non-linear tightening portion followed by a substantially linear tightening portion, said method comprising;
establishing a predetermined preload which is to be induced in the fastener when the assembly has been tightened to the desired degree;
determining the preload in the fastener at the onset of said substantially linear tightening portion;
determining the tension rate of the assembly;
imparting torque and rotation to the fastener;
identifying said onset of said substantially linear tightening portion;
calculating a tightening angle related to the rotation to be imparted to the fastener after said onset of said substantially linear tightening portion to induce said predetermined preload in the fastener, said calculation being made by dividing the difference between said predetermined preload and said preload at the onset of said substantially linear tightening portion by said tension rate;
determining when said rotation imparted to the fastener after said onset of said substantially linear tightening portion is equal to said tightening angle;
and ceasing to impart torque and rotation to the fastener when said rotation imparted to the fastener after said onset of said substantially linear tightening portion is equal to said tightening angle.

9. A method according to claim 8 wherein the onset of the substantially linear tightening portion is identified by calculating the gradient of the torque-rotation curve and identifying when said gradient is substantially constant.

10. A method according to claim 9 wherein the value of the gradient at one rotational position of the fastener is compared with the gradient at another rotational position of the fastener to determine when there is no change in the gradient.

11. Apparatus according to claim 2 wherein said memory means also store a third angle signal representative of the amount of overshoot rotation of the threaded fastener after the control signal has been supplied to the driving means.

12. Apparatus according to claim 11 wherein said processing means include:
a first subtractor circuit responsive to the first preload signal and the second preload signal for developing a difference signal representative of the difference between the predetermined preload and the preload at the onset of the substantially linear tightening portion;
a divider circuit responsive to said difference signal and the tension rate signal for developing said second angle signal representative of said difference between said predetermined preload and said preload of said onset of said substantially linear tightening portion divided by said tension rate;
and a second subtractor circuit responsive to said second angle signal and said third angle signal for developing the corrected tightening angle signal representative of the difference between the angles represented by said second angle signal and said third angle signal.

* * * * *